No. 711,227.  
F. H. RICHARDS.  
PLAYING BALL.  
(Application filed June 14, 1902.)  
Patented Oct. 14, 1902.
(No Model.)
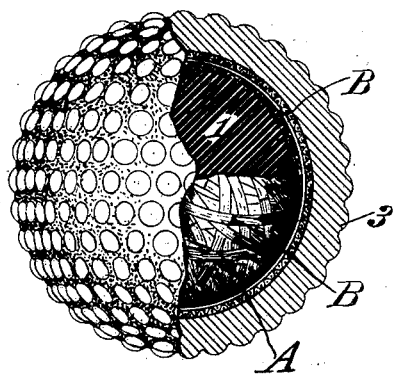
Witnesses.
Inventor

UNITED STATES PATENT OFFICE.

FRANCIS H. RICHARDS, OF HARTFORD, CONNECTICUT, ASSIGNOR TO THE KEMPSHALL MANUFACTURING COMPANY, A CORPORATION OF NEW JERSEY.

PLAYING-BALL.

SPECIFICATION forming part of Letters Patent No. 711,227, dated October 14, 1902.

Application filed June 14, 1902. Serial No. 111,776. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Playing-Balls, of which the following is a specification.

This invention relates to playing-balls, especially those used in the game of golf; and its object is to produce at low cost a ball having exceptional flying power under a hard blow, but inactive under a light blow.

In the drawings forming part of this specification, Figure 1 is a view of a ball made in accordance with my present improvements and shown partly in section, and Fig. 2 is a view of one of a series of spring-hoops binding the filling of the ball.

The interior of the ball preferably comprises a sphere 1, of soft rubber, preferably molded solid rubber. Upon said sphere I apply promiscuously a series of independent spring hoops or bands 2, thereby forming a tense metallic casing or lattice-work A. The springs are preferably flat or oblong in cross-section, and the number thereof may be varied to suit the ball to different games or to give it different qualities. The hoops before application are of smaller diameter and are sprung open to fit upon the ball, the ends of each hoop when sprung preferably meeting, as at B, and since each hoop tends constantly to recover its normal condition every portion of the casing A is in a state of high initial tension, which is a feature of importance. The structure hence comprises a sphere of soft rubber which is bound tightly within a casing of tense springs and shows great activity when given a heavy blow. The reaction of the device is instantaneous and powerful, and hence an enormous amount of power may be imparted to the ball, thus prolonging its flight. Wire having other cross-sections and of any suitable spring metal may be used. Upon the casing A, I apply a gutta-percha shell 3, preferably formed under heat and pressure and holding the filling under compression.

The spring-casing A may be faced with a fabric layer 4, if desired, to prevent the wire from cutting, especially when thin round wire is used.

Having described my invention, I claim—

1. In a playing-ball, the combination with a sphere of yielding material, of a series of independent metallic hoops expanded and binding upon said sphere and forming a lattice-work casing thereon.

2. In a playing-ball, the combination with a sphere of soft rubber of a series of promiscuously-arranged independent spring-hoops expanded thereon, and a hard, springy cover upon said hoops.

3. In a playing-ball, the combination with a cover, of a series of independent circular tempered-metal springs confined within said cover and in a tense condition.

4. In a playing-ball, the combination with a sphere of yielding material, of a series of independent metal springs independently expanded thereon and each in a tense condition, and a cover inclosing said springs.

5. In a playing-ball, the combination with a sphere of yielding material, of a series of independent curved metal springs clasping said sphere, a shell of plastic material, and an intermediate layer of pliant material.

6. In a playing-ball, the combination with a sphere of yielding material, of a series of independent curved metal springs expanded thereon and in a tense condition, a shell of plastic material holding said springs and sphere under compression, and an intervening layer of fabric.

7. In a playing-ball, the combination with a sphere of yielding material, of a series of independent metal springs expanded over said sphere, and a shell of gutta-percha holding said springs and sphere under compression.

8. In a playing-ball, the combination with a sphere of yielding material, of a series of independent metallic hoops in a state of expansion and binding upon said sphere and forming a lattice-work casing thereon; said hoops being oblong in cross-section and placed flatwise upon said sphere; a gutta-percha cover; and a fabric layer next to said hoops.

9. In a playing-ball, the combination with a cover, of a series of promiscuously-arranged independent circular metal springs confined within and supporting said cover and in a tense condition and forming an irregular lattice-work sphere.

FRANCIS H. RICHARDS.

Witnesses:
B. C. STICKNEY,
JOHN O. SEIFERT.